US010861317B2

(12) United States Patent
Wengrovitz et al.

(10) Patent No.: US 10,861,317 B2
(45) Date of Patent: *Dec. 8, 2020

(54) WEARABLE SMART GATEWAY

(71) Applicant: MUTUALINK, INC., Wallingford, CT (US)

(72) Inventors: Michael S. Wengrovitz, Concord, MA (US); Derrell Lipman, Billerica, MA (US); Joseph R. Mazzarella, Tolland, CT (US)

(73) Assignee: MUTUALINK, INC., Wallingford, CT (US)

( * ) Notice: Subject to any disclaimer, the term of this patent is extended or adjusted under 35 U.S.C. 154(b) by 14 days.

This patent is subject to a terminal disclaimer.

(21) Appl. No.: 16/392,084

(22) Filed: Apr. 23, 2019

(65) Prior Publication Data
US 2019/0266882 A1 Aug. 29, 2019

Related U.S. Application Data

(63) Continuation of application No. 14/919,177, filed on Oct. 21, 2015, now Pat. No. 10,269,234.

(51) Int. Cl.
*G08B 25/10* (2006.01)
*G08B 25/14* (2006.01)
(Continued)

(52) U.S. Cl.
CPC ............ *G08B 25/10* (2013.01); *G08B 25/14* (2013.01); *H04M 1/7253* (2013.01); *H04W 4/80* (2018.02);
(Continued)

(58) Field of Classification Search
CPC ...... G08B 25/10; G08B 25/14; H04M 1/7253; H04W 4/80; H04W 76/12; H04W 84/18; H04W 76/14; H04W 88/16
See application file for complete search history.

(56) References Cited

U.S. PATENT DOCUMENTS 5,081,071 A 1/1992 Hirschkoff
7,643,445 B2 1/2010 Mills et al.
(Continued)

FOREIGN PATENT DOCUMENTS

EP 2557892 A1 2/2013

OTHER PUBLICATIONS

International Search Report Directed to International Application No. PCT/US2016/016583, dated Jun. 13, 2016; 4 pages.
(Continued)

*Primary Examiner* — Walter J Divito
(74) *Attorney, Agent, or Firm* — Sterne, Kessler, Goldstein & Fox, P.L.L.C.

(57) ABSTRACT

Embodiments include a system, method, and computer program product for a wearable smart gateway (WSG) that is capable of providing interoperability gateway functions for a variety of wearable devices. In an embodiment, the WSG detects one or more devices within a proximity that use communication interfaces supported by corresponding plug-ins installed in the memory. Then, the WSG establishes communication channels with the detected one or more devices according to configurations within the corresponding plug-ins, wherein the established communication channels forms a personal area network. The WSG may perform interoperability gateway functions to communicate data monitored by the one or more devices within the personal area network to an agency via a wide area data network.

20 Claims, 9 Drawing Sheets

(51) Int. Cl.
*H04W 4/80* (2018.01)
*H04W 76/12* (2018.01)
*H04M 1/725* (2006.01)
*H04W 88/16* (2009.01)
*H04W 76/14* (2018.01)
*H04W 84/18* (2009.01)

(52) U.S. Cl.
CPC ............ *H04W 76/12* (2018.02); *H04W 76/14* (2018.02); *H04W 84/18* (2013.01); *H04W 88/16* (2013.01)

(56) References Cited

U.S. PATENT DOCUMENTS

| | | |
|---|---|---|
| 8,320,874 B2 | 11/2012 | Miiis et al. |
| 8,364,153 B2 | 1/2013 | Boucher et al. |
| 8,731,583 B2 | 5/2014 | Wengrovitz |
| 8,811,940 B2 | 8/2014 | Boucher et al. |
| 9,871,575 B2 | 1/2018 | Wengrovitz et al. |
| 10,242,556 B2 | 3/2019 | Wengrovitz et al. |
| 2004/0066273 A1 | 4/2004 | Cortina et al. |
| 2005/0286476 A1 | 12/2005 | Crosswy et al. |
| 2007/0103292 A1 | 5/2007 | Burkley et al. |
| 2007/0190368 A1 | 8/2007 | Jung et al. |
| 2010/0083730 A1 | 4/2010 | Le et al. |
| 2010/0085469 A1 | 4/2010 | Takemasa |
| 2010/0250921 A1 | 9/2010 | Spencer et al. |
| 2012/0134257 A1 | 5/2012 | Knox |
| 2013/0006673 A1 | 1/2013 | Hurston et al. |
| 2013/0198517 A1 | 8/2013 | Mazzarella |
| 2014/0018001 A1 | 1/2014 | Nakra et al. |
| 2014/0173700 A1 | 6/2014 | Awan et al. |
| 2014/0219784 A1 | 8/2014 | Nourollah |
| 2014/0240124 A1 | 8/2014 | Bychkov |
| 2015/0004927 A1 | 1/2015 | Mao et al. |
| 2015/0126119 A1 | 5/2015 | Schulz et al. |
| 2015/0180978 A1 | 6/2015 | Canpolat et al. |
| 2015/0182132 A1 | 7/2015 | Harris et al. |
| 2015/0234986 A1 | 8/2015 | Dantsker et al. |
| 2016/0100303 A1 | 4/2016 | Kim et al. |
| 2016/0233946 A1 | 8/2016 | Wengrovitz et al. |
| 2016/0249158 A1 | 8/2016 | Tredoux et al. |
| 2017/0116846 A1 | 4/2017 | Wengrovitz et al. |
| 2019/0221106 A1 | 7/2019 | Wengrovitz et al. |

OTHER PUBLICATIONS

International Preliminary Report on Patentability and Written Opinion Directed to International Application No. PCT/US2016/016583, dated Aug. 8, 2017; 7 pages.

International Search Report Directed to Related International Application No. PCT/US2016/058222, dated Mar. 30, 2017; 6 pages.

International Preliminary Report on Patentability and Written Opinion Directed to Related International Application No. PCT/US2016/058222, dated Apr. 24, 2018; 12 pages.

WEARABLE SMART GATEWAY

CROSS-REFERENCE TO RELATED APPLICATIONS

This application is a continuation of U.S. application Ser. No. 14/919,177, filed Oct. 21, 2015, which is hereby incorporated by reference in its entirety.

BACKGROUND

Field

The embodiments generally relate to providing a wearable smart gateway, and more particularly, to providing a portable self-contained mesh capable device having a flexible architecture for providing gateway functions for a variety of wearable devices.

Background

Presently, a plethora of disparate communications resources exist including resources using private wireless communications (e.g., public safety and first responder communications networks), public switched network communications resources, public wireless networks, networks of video surveillance devices, private security networks, and the like. Additionally, millions of consumers and public officials are now equipped with smartphone devices that include multiple communications abilities including both voice and video communications.

Often these communications resources cannot communicate with each other. For example, private wireless communication networks, such as those used by public safety or commercial users, are typically isolated from one another and utilize different and often incompatible technologies. While interoperability products are available to interconnect such diverse systems, cooperation among the entities involved is often a barrier to full and scalable implementation. Thus, first responder communication systems exist (e.g., siloed communications systems), where control of the resources of each organization coupled to the system is controlled by a central administrator or controller, and each organization providing resources to the system must relinquish control of its resources to the central administrator. The organization responsible for the operation of its radio system(s) may be unable or unwilling to grant control of its resources either to peer organizations or to a higher-level organization.

U.S. Pat. No. 7,643,445, entitled Interoperable Communications System and Method of Use, issued on Jan. 5, 2010, and U.S. Pat. No. 8,320,874, entitled System and Method for Establishing an Incident Communications Network, issued on Nov. 27, 2012, both of which are incorporated by reference in their entirety, describe systems and methods for providing an interoperable communications system ("interop system," also referred to as an Incident Communications Network) including a plurality of otherwise disjunct or disparate communications systems that addressed the deficiencies of prior art systems. The '445 and '874 patents specifically describe methods for establishing an incident communications network that enables interoperable communications among communications resources controlled by multiple organizations during an incident involving emergency or pre-planned multi-organization communications wherein a communications resource is controlled by an administrator within an organization.

Additionally, U.S. Pat. No. 8,364,153, entitled Mobile Interoperability Workstation Controller Having Video Capabilities within an Incident Communications Network, issued on Jan. 29, 2013, ("Mobile IWC Patent") which is also incorporated herein by reference in its entirety, extends the concepts of the '445 and '874 patents. Namely, the Mobile IWC Patent includes enhanced video capture and streaming capabilities that are integrated with incident information and events to facilitate improved management and analysis of incidents or events in which an incident communications network is employed.

U.S. Pat. No. 8,811,940, entitled Dynamic Asset Marshalling Within an Incident Communications Network, issued on Aug. 19, 2014, ("Marshalling Patent") which is also incorporated herein by reference in its entirety, extends the concepts of the '445 and '874 patents. Namely, the Marshalling Patent provides systems and methods that marshal resources into an incident communications network based on a variety of factors, such as the type of incident and the type of resource being marshaled.

U.S. Patent Publication 2013/0198517, entitled Enabling Ad Hoc Trusted Connections Among Enclaved Communication Communities, filed on Mar. 13, 2013, ("Enclaved Application") which is also incorporated herein by reference in its entirety, extends the concepts of the '445 and '874 patents. Namely, the Enclave Application presents systems and methods for dynamic access among secure communities, such as incident communications networks, that enables communication resources of a first secure community to securely access and/or utilize communication resources within other secure communities.

Wearable Devices Operating Specific Communication Interfaces

In conventional mobile gateway systems, an agency may provide a system of gateways mounted within racks on vehicles. Instead of having gateways that are agency based, what is needed are gateways that are based on individual field personnel.

But, individual field personnel often carry a plurality of wearable devices including, potentially, legacy devices using outdated communication interfaces or protocols and recently-released devices using the most current and advanced communication interfaces and protocols. Current gateways are not field personnel based and may not be able to support the vast array of communication interfaces operated by the wearable devices.

Inflexible Gateways

Moreover, not only are conventional gateways statically mounted to, for example, vehicles, conventional gateways are also not flexibly configured to access a wireless network. What is needed are gateways that are portable, self-contained and able to determine an optimal connectivity path to access the IP-based network.

BRIEF SUMMARY OF THE INVENTION

What is needed is a system, method, and computer medium storage for a wearable smart gateway (WSG) that has a flexible architecture for telemetering data monitored from a plurality of devices to an agency. In an embodiment, the WSG detects one or more devices within a proximity of the WSG and uses communication interfaces supported by corresponding plug-ins installed in the memory of the WSG. The WSG may establish communication channels with the detected one or more devices according to configurations within the corresponding plug-ins, wherein the established communication channels form a personal area network.

Embodiments enable the WSG to detect and select a connectivity path provided by a device having access to the wide area data network for connecting to the agency. The WSG may establish a VPN tunnel or secure communication means within the detected connectivity path. Finally, the WSG may perform interoperability gateway functions to communicate data monitored by the detected one or more devices within the personal area network to an agency via the VPN tunnel.

Embodiments include a system, method, and computer medium storage for an application server for providing management and monitoring of a plurality of WSGs. In an embodiment, one or more processors may establish communication channels with one or more wearable smart gateways (WSGs). The WSG performs interoperability gateway functions to enable devices within a proximity threshold of the WSG to telemeter data through the WSG. The one or more processors may receive, from the one or more WSGs through a wide area data network, data monitored by a plurality of devices detected by corresponding WSGs, such that data monitored by devices corresponding to the WSG is associated with a corresponding field user operating the WSG. Finally, the one or more processors may provide a graphical user interface (GUI) depicting current statuses of corresponding field users associated with corresponding WSGs, wherein a current status of a field user includes a subset of data monitored by devices detected by the WSG, and wherein the subset of data is associated with a same point in time.

Further embodiments, features, and advantages, as well as the structure and operation of the various embodiments, are described in detail below with reference to accompanying drawings. It is noted that the embodiments are presented herein for illustrative purpose only. Additional embodiments will be apparent to persons skilled in the relevant art(s) based on the teachings contained herein.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention.

The drawing in which an element first appears is typically indicated by the leftmost digit or digits in the corresponding reference number. In the drawings, like reference numbers may indicate identical or functionally similar elements.

DETAILED DESCRIPTION

System

Figure 1:
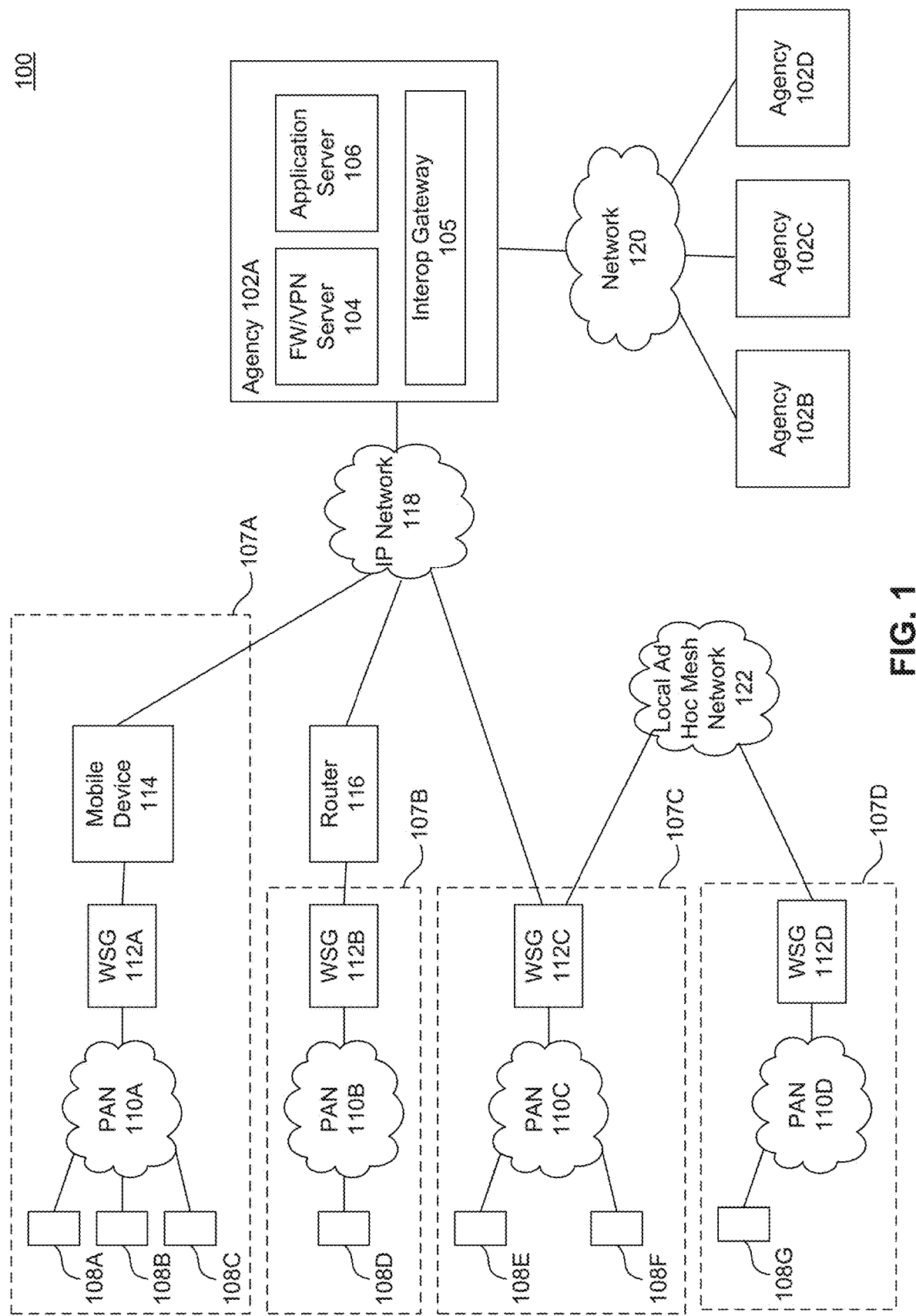
FIG. 1 is a block diagram of a system for configuring and managing wearable smart gateways (WSGs), according to an embodiment.

FIG. 1 illustrates an example system 100 for configuring and managing wearable smart gateways (WSGs), according to an example embodiment. As shown, system 100 may include agencies 102 and field personnel 107 that are associated with, for example, agency 102A.

Field personnel 107 may be armed forces personnel, public safety workers, or first responders, which may include police officers, firefighters, paramedics, and emergency medical technicians. To respond to emergencies and communicate effectively amongst each other, field personnel 107 such as first responder may carry or wear a host of wearable devices 108 including, for example, body cameras and body-worn biosensors.

In an embodiment, wearable devices 108 may be individual devices that are carried or held by, nearby, or associated with field personnel 107, and which operate on different communication interfaces or protocols. Possible protocols may include wireless or wired communication protocols such as WiFi, Bluetooth, USB wire, Zigbee, or a proprietary communication protocol. For example, field personnel 107C may be operating devices 108E-F. Whereas device 108E may use WiFi and is strapped to the chest, device 108F may use ZigBee and is worn on top of the head. In an embodiment, wearable devices 108 may also include mobile device 114. In an embodiment, wearable devices 108, such as wearable device 108A, may be a remote controller for accessing or controlling a separate device, such as a drone or robot. Wearable device 108A may wirelessly communicate with a drone (not shown) and include a display for viewing visual or audio information captured by another device, e.g., the drone. By establishing connectivity to wearable device 108A, WSG 112A may then transmit and share with an operator of agency 102A through IP network 118 the visual or audio information captured by the remote device controlled by wearable device 108A.

In an embodiment, one or more of wearable device 108 may not be capable of accessing IP network 118 in real time due to limitations on hardware, size, or software versions. Or wearable device 108 may be a device implemented with limited network capabilities or with proprietary communication interfaces. Field personnel 107 may, therefore, carry or wear WSG 112 that relays information gathered by wearable devices 108 to agency 102A through IP network 118. WSG 112 may further associate the gathered information with a specific time and with each other. IP network 118 may be representative of a wired and/or wireless network, and may include any combination of local area networks (LANs), wide area networks (WANs), the Internet, a radio-mobile network like 3G/4G LTE, or a wide area data communications network, etc.

WSG 112 may be implemented on one or more processors that provide personal area network (PAN) 110 for detecting and communicating with both legacy and emerging wearable devices 108 being operated by respective field personnel 107. Particularly, WSG 112 may establish wired or wireless data communication links, e.g., network connectivity, with wearable devices 108 each possibly operating different communication interfaces and telemeter real-time data monitored by wearable devices 108 to agency 102A.

Figure 2:
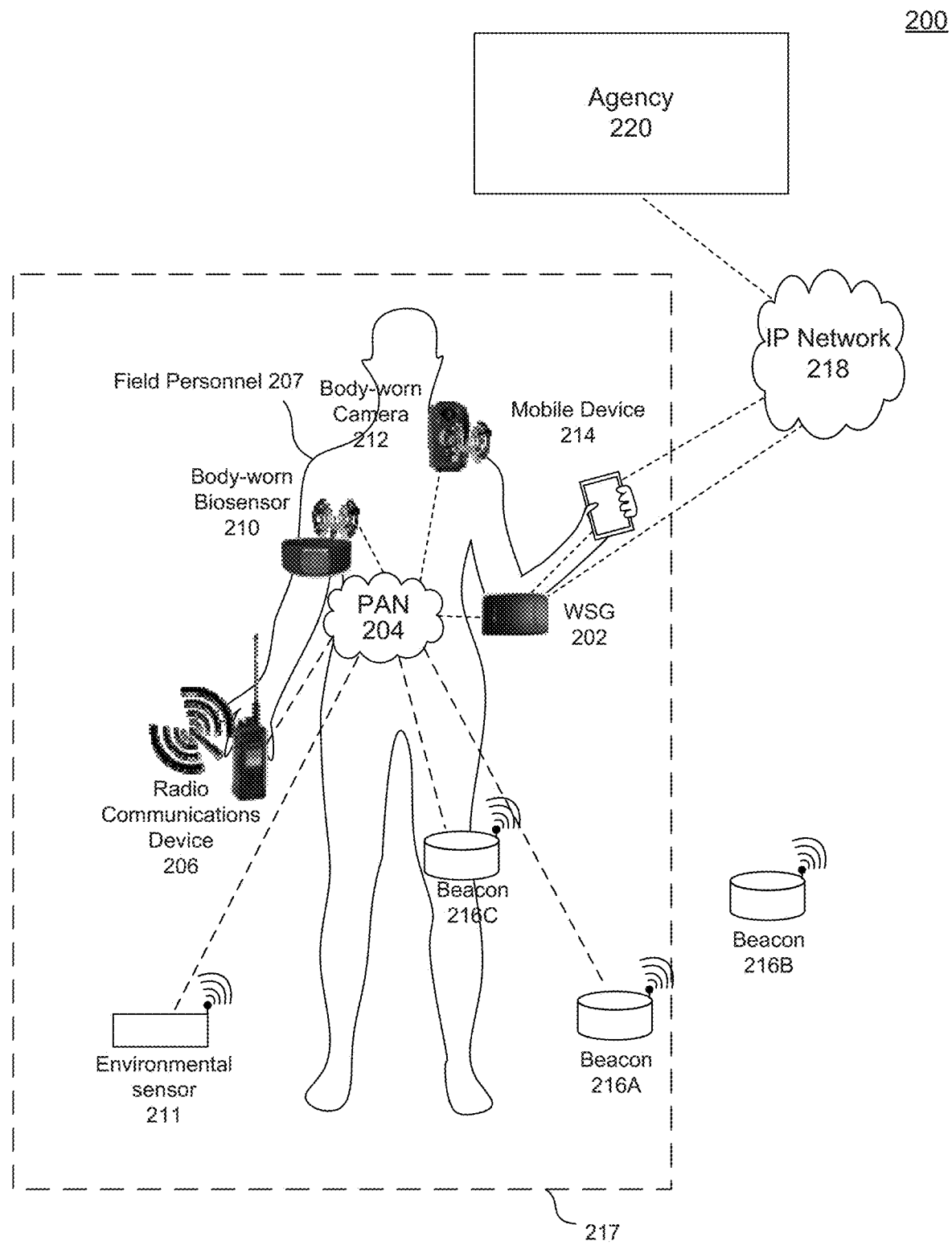
FIG. 2 is a block diagram of a system of a field personnel operating a WSG and a plurality of wearable devices, according to an embodiment.

FIG. 2 illustrates a more detailed system 200 including field personnel 207 operating a plurality of wearable devices and using WSG 202 to telemeter data gathered by the plurality of devices within proximity 217 to agency 220 through IP network 218, according to an example embodiment. In an embodiment, field personnel 207, WSG 202, IP network 218, and Agency 220, may be exemplary field personnel 107A, WSG 112A, IP network 118, and agency 102A from FIG. 1, respectively.

Beacon 216 may be a device that transmits pings or wireless signals indicating a presence of beacon 216. Beacon 216 may be a wearable device, such as beacon 218C, or non-wearable devices, such as beacons 218A-B. In an embodiment, beacon 216 may be configured by agency 220 to transmit pings or wireless signals periodically, continuous, or on-demand. In an embodiment, upon field personnel 207 entering a communication range of beacon 216, specifically beacon 216A that is within proximity 217, WSG 202 may telemeter received pings from beacon 216A to agency 220.

In an embodiment, field personnel 207 may wear or hold WSG 202 that provides PAN 204, such as PAN 110A, for communicating with a plurality of wearable devices, such as wearable devices 108A-C from FIG. 1, including at least one of body-worn biosensor 210, body-worn camera 212, radio communications device 206, beacon 216C, or mobile device 214. WSG 202 may also provide and enable communication links with devices that are not necessarily wearable including environmental sensor 211 and beacons 216A-B. As shown in FIG. 2, WSG 202 may establish communication with beacon 216A, which is non-wearable, because beacon 216A is within proximity 217. But, WSG 202 may be unable to communicate with or refuse communication with beacon 216B, which is also non-wearable, because beacon 216B is not within proximity 217.

PAN 204 includes one or more wired and/or a wireless data communication links for wearable devices in close proximity. For example, PAN 204 may include at least one of a wired interface including but not limited to a universal serial bus (USB), or a wireless interface including but not limited to: a Bluetooth, WiFi, Zigbee, or other wireless protocols. The number and types of wired or wireless communication interfaces or protocols supported by WSG 202 within PAN 204 may depend on the number and types of plug-ins stored and installed on WSG 202.

Body-worn biosensor 210 are sensor devices that may monitor one or more biometric signal including, for example, a fingerprint information, a respiration rate, a heart rate, a blood pressure, a perspiration rate, an oxygen level, a body temperature, a voltaic skin response, a bioelectric activity (e.g., EKG, EEG, neuronal probe data), an altitude, a pitch, a yaw, a rotation or other angular movement, a position, a force, a location, an acceleration, a deceleration, or a change in any of the above (e.g., a change in respiration rate, a change in an acceleration, or a change in a voltaic skin response). For example, body-worn biosensor 210 may be a wrist-strapped watch that measures multiple biometric signals.

Environmental sensor 211 may be a body-worn or proximate device that monitor one or more environmental statuses such as an ambient temperature, a wind chill, a dew point, a radiation level, a smoke level, a chemical level, a biological agent, a sound, a pressure, a humidity level, a precipitation level, an air pollutant, a lightning strike, a terrain, an altitude, a location (e.g., from a global positioning system (GPS)), or an air quality level. In an embodiment, WSG 202 may provide PAN 204 to environmental sensor 211 when within a wireless communication range or within a proximity threshold distance of environmental sensor 211 and WSG 202 includes a plug-in or driver supporting the communication interface for telemetering statuses gathered by environmental sensor 211. In an embodiment, the proximity threshold distance may be determined based on comparing geolocations between the WSG 202 and the wearable devices, such as environmental sensor 211.

In an embodiment, non-wearable beacon 216 including, for example, beacons 216A-B may be devices mounted in a room and have a communication range or proximity threshold configured based on the size of the room. In an embodiment, a mounted beacon, i.e., beacon 216A, may detect the number of field personnel 207 or specific field personnel 207 within the room. For example, whenever any field personnel, such as field personnel 207, enters within the communication range or proximity threshold associated with beacon 216A (e.g., by entering the room), beacon 216A may detect a presence of field personnel 207. Beacon 216A may then alert associated agencies, such as agency 220, of detected information by direct connection to IP network 218 or via WSG 202 of one field personnel 207 within the communication range of beacon 216A.

In an embodiment where agency 220 knows an absolute location of beacon 216, a relative position of field personnel 207 may be determined based on the telemetered ping indicating field personnel 207 is proximate to beacon 216. In an embodiment, agency 220 may receive an absolute location, such as a GPS location, of beacon 216 from beacon 216 or from the received ping.

In an embodiment, although WSG 202 may detect both beacon 216A and beacon 216B, WSG 202 may only telemeter information and statuses from beacon 216A to agency 220 and not beacon 216B due to settings or parameters stored in WSG 202. In an embodiment, the parameters may be received from agency 220 and include one or more of a beacon signal strength threshold, a distance threshold from a beacon, a processing bandwidth of WSG 202, or communication bandwidth to IP network 218.

Body-worn camera 212 may wearable devices that may record or store images, audio, or video data. In an embodiment, body-worn camera 212 may be activated and deactivated based on signals electronically received from WSG 202. A received signal may initiate audio and visual recording as well as the capture of still images that may be streamed, or stored and forwarded to WSG 202 having interoperability gateway functions.

Radio communications device 206 may be a radio device, such as a Wi-Fi radio device, capable of connecting to PAN 204. In an embodiment, with the gateway capabilities of WSG 202, radio communications device 206 may receive from and transmit to radio channels within agency 220 through IP network 218.

Mobile device 214 may be a computing device having broadband data capabilities and implemented with an operating system that may include but is not limited to, for example, the iOS platform produced by Apple Inc. of Cupertino, Calif., the Android platform produced by Google Inc. of Mountain View, Calif., the Windows platform produced by Microsoft Corp. of Redmond, Wash., the Blackberry platform produced by Blackberry Ltd. of Ontario, Calif., or the open-source Linux platform (e.g., a smart phone). In an embodiment, mobile device 214 may include interoperability gateway functions that enable bridging and sharing of data from WSG 202 to IP network 218. Mobile device 214 with broadband data may be coupled to IP network 218 using, for example, 3G/4G LTE network protocols.

In an embodiment, depending on settings, parameters, hardware, or software capability determinations on WSG 202, WSG 202 may telemeter some or all of the data monitored by the wearable devices to IP network 218 through mobile device 214. For example, WSG 202 may detect that battery power is low and forward data to mobile device 214 to save power.

Returning to FIG. 1, WSG 112 may be dynamically and remotely programmed by agency 102A to support the variety of communication interfaces compatible with respective wearable devices 108. For example, WSG 112A may wirelessly receive and install a driver or plug-in to support a particular application operating on wearable device 108C compatible with, for example, only a USB interface. With the installed plug-in in WSG 112A, field personnel 107A may directly connect wearable device 108C to WSG 112A via a USB cable and telemeter information collected by wearable device 108C in real-time to agency 102A.

In an embodiment, WSG 112 may access IP network 118 to connect with agency 102A via one or more proximate devices, such as mobile device 114 or router 116. Depending on hardware and software implementation of WSG 112, WSG 112 may connect to mobile device 114 or router 116 through a wired or wireless communication interface. In an embodiment, WSG 112 may select from possible connectivity paths and determine an optimal connectivity path to connect with agency 102A. For example, WSG 112A may be coupled to mobile device 114, which has access to IP network 118. In contrast, WSG 112, such as WSG 112B, may be proximate to another device, such as router 116 mounted within a field personnel vehicle, having networking circuitry for accessing IP network 118. Finally, WSG 112, such as WSG 112C, may itself include network chips for directly accessing IP network 118, which may include a 4G, 4G LTE, or WiMAX networks. In an embodiment, a WSG, such as WSG 112A, may be directly coupled and attached to mobile device 114, which may be a FirstNet smartphone having access to IP network 118, which may be a 4G public safety broadband network dedicated to first responders and operating in a specified frequency band. In an embodiment, an optimal connectivity path be determined based on network bandwidths, proximity of devices providing path to WSG 112, signal strengths, environmental interferences, quality of service measured by bit error rate, an actual or relative battery power level of WSG 112, power consumption of WSG 112 to use connectivity paths, processor or memory load of WSG 112, or parameters or settings within WSG 112 from agency 102A.

In an embodiment, WSG 112 may additionally be a portable mesh capable radio transceiver device that includes and runs a mesh network software application to detect, form, and/or join local ad hoc mesh network 122 with other mesh-capable WSG 112. In an embodiment, electronically transmitting information to another mesh-capable WSG 112 may be a possible connectivity path to IP network 118. For example, WSG 112C and WSG 112D may be mesh-capable devices where WSG 112C is determined to be an optimal endpoint within local ad hoc mesh network 122 such that WSG 112C may relay and telemeter data and information received from local ad hoc mesh network 122 to agency 102A. In this way, WSG 112D may telemeter data from wearable device 108G without directly accessing IP network 118. For example, WSG 112 may be the man-portable mobile ad-hoc radio based linked extensible (MARBLE) network device described in patent application Ser. No. 14/615,070.

To better support first responders conditions, WSG 112 may be constructed as a compact, lightweight, portable, and palm-sized standalone device enclosed by a hardened casing. In an embodiment, WSG 112 may further include hardware and software for maximizing battery life when not being charged by a power source to provide a first responder with maximum utility.

Agency 102A may be a computer-based system including one or more servers for managing and configuring WSG 112 operated by field personnel 107 associated with agency 102A. In an embodiment, agency 102A may be implemented partly or entirely in a cloud environment, such as a private cloud, a government security cloud, US army cloud, or an Amazon cloud.

In an embodiment, agency 102A may include interop (interoperability) gateway 105, FW/VPN server 104, and application server 106. Though depicted as separate devices, interop gateway 105 and FW/VPN server 104 may be implemented within a single router, server, or gateway device.

Application server 106 may be one or more servers that hosts a WSG application or provide the functionality of the WSG application for managing WSGs 112 and monitoring statuses of field personnel 107 as captured by wearable devices 108 corresponding to respective WSGs 112. In an embodiment, the WSG application may be a server-based software application communicatively coupled to software clients installed and operating on computing devices, such as mobile device 114. In an embodiment, the installed software clients may instead be an application instance of the WSG application. In an embodiment, application server 106 may implement within the WSG application functionalities of an interoperability workstation (not shown) as described in the '445 and '874 patents.

FW/VPN server 104 may include one or more processors for establishing virtual private network (VPN) tunnels or secure communication means between WSG 112 of field personnel 107 and agency 102A. A VPN tunnel enables data communicated between agency 102A and a WSG, such as WSG 112A, to remain encrypted to increase privacy and security. In an embodiment, FW/VPN server 104 may provide end-to-end encryption using one or more of hardware FPG-based or software-based encryption algorithms, such as AES256. In an embodiment, FW/VPN server 104 may provide secure communication means by encrypting data sent from FW/VPN server 104.

FW/VPN server 104 may further include firewall functions for monitoring and controlling incoming and outgoing network traffic to and from agency 102A. In an embodiment, firewall functions may be implemented in a separate firewall server coupled to FW/VPN server 104 or be implemented within interop gateway 105.

Interop gateway 105 may include operability gateway functions to transmit statuses or multimedia communications from field personnel 107, which are associated with agency 102A, to other agencies 102B-D through network 120. Similarly, interop gateway 105 may include operability gateway functions to enable agency 102A to receive from agencies 102B-102D similar information of field personnel that are associated with respective agencies 102B-102D. In an embodiment, interop gateway 105 may validate or authorize whether information or statuses of field personnel 107 may be shared.

In an embodiment, agencies 102 may operate separate secure systems or different communication or network interfaces. Additionally, there may exist two or more networks of communications or agencies, each having different secrecy classifications. In an embodiment, interop gateway 105 may be coupled to or include a cross-domain information sharing system. Network 120 may be a network, such as FirstNet network, separate from IP network 118 or a private network within IP network 118. Similar to IP network 118, network 120 may be a wired and/or wireless network, and may be any combination of LANs, WANS, etc.

Figure 3:
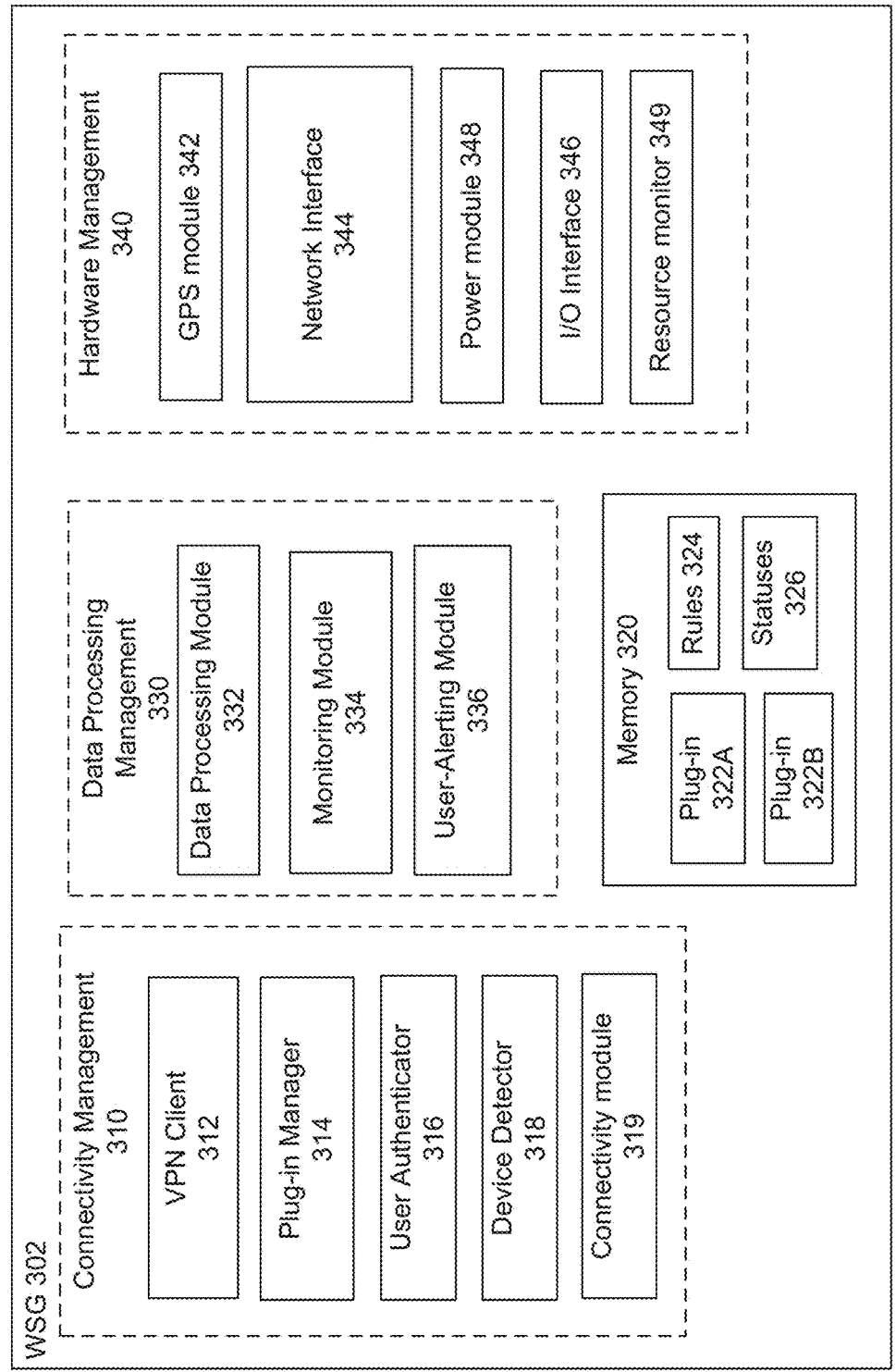
FIG. 3 is a block diagram of a WSG, according to an embodiment.

FIG. 3 is a block diagram of WSG 302 worn by a field personnel and having a flexible software and hardware architecture for enabling wearable devices to securely telemeter data to an agency of the field personnel, according to an example embodiment. In an embodiment, WSG 302 may be an exemplary implementation of WSG 112 of system 100 from FIG. 1.

In an embodiment, WSG 302 may include memory 320 for storing rules 324, and statuses 326. Rules 324 may be implemented as a data store of rules and parameters used in connectivity management 310, data processing management 330, and hardware management 340 described below. Rules 324 may include default settings or rules and parameters received from agency 102A of field personnel 107A operating WSG 302, i.e., WSG 112A of FIG. 1. Statuses 326 may include internal system statuses of WSG 302 measured or monitored by modules of hardware management 340. Statuses 326 may also include external data or information gathered or measured by wearable devices 108 that have been detected and communicatively coupled or linked to WSG 302 by modules of connectivity management 310. In an embodiment, various modules may query statuses 326 against rules 324 to determine whether specific rules or parameters have been met. In an embodiment, memory 320 may store plug-ins 322 configured by one or more modules of connectivity management 310 explained below.

In an embodiment, WSG 302 includes one or more processors for implementing various modules for connectivity management 310, data processing management 330, and hardware management 340. For ease of understanding, descriptions of the modules of FIG. 3 may refer to FIGS. 1-2. A module (or component) of WSG 302 may include a selection of stored operations that when executing in the one or more processors causes the one or more processors to perform the operations of the module.

In an embodiment, modules for performing hardware management 340 may include GPS module 342, network interface 344, power module 346, I/O interface 348, and resource monitor 347.

GPS module 342 may monitor a GPS location or coordinate captured by a GPS chip within WSG 302 or within a proximate device, such as mobile device 114 of FIG. 1. In an embodiment, GPS module 342 may store the captured GPS coordinate as a field personnel location status in statuses 326 of memory 320. In an embodiment, WSG 302 may transmit the GPS location to agency 102A periodically, continuously, or by request by agency 102A or by field personnel 107A as set forth in rules 324 of memory 320.

Network interface 344 may manage one or more network interface cards (NICs) integrated within WSG 302 to provide connectivity to wearable devices 108 operating different network interfaces and protocols. In an embodiment, WSG 302 may include one or more NICs for supporting one or more of Ethernet, Wi-Fi, Bluetooth, Zigbee, 3G, 4G, LTE, or WiMAX. In an embodiment, WSG 302 may include one or more band class 14 chips to enable connectivity to a public safety network spectrum such as FirstNet. In an embodiment, network interface 344 supporting a band class 14 chip may enable WSG 302 to act as a hub for other mobile devices to access the public safety network, such as First Net.

I/O interface 346 may manage one or more physical ports of WSG 302. In an embodiment, I/O interface 346 may enable one or more of a universal serial bus (USB) port, an Ethernet port, a serial port, an AC power connection port, or a DC power connection port to be used to charge a battery in WSG 302. In an embodiment, I/O interface 346 supports an I/O port that enables WSG 302 to be plugged into a separate device, such as mobile device 114 or a router 116 of FIG. 1. Not only may WSG 302 be powered based on the coupled device, but also WSG 302 may leverage processing capabilities of the separate device using power and IP-over-USB connectivity from the coupled device. In an embodiment, processing capacity and capabilities of the coupled device may be stored in statuses 326 and modules within data processing management 330 may determine a distribution of co-processing between WSG 302 and the coupled device.

In an embodiment, I/O interface 346 may manage one or more sensors or output transducers implemented on WSG 302. For example, output transducers may include one or more of a speaker, a light, or a haptic feedback generator like a vibrating motor. In an embodiment, an intensity, a pattern, or type of output, such as a displayed color by the light, may be configured to represent a status, such as a heart rate level, of field personnel operating WSG 302. For example, an output light may be configured to increase in brightness or blink at a faster rate as a status of field personnel 207 becomes dangerous, e.g., a heart rate level increases. In an embodiment, sensors may include one or more environmental sensors, such as environmental sensor 211 from FIG. 2, or one or more request buttons or touch-screen options that when activated by field personnel 107A sends an associated request. For example, a panic button when pressed may indicate that field personnel 107A is requesting help or immediate assistance. Other requests may include establishing a new VPN tunnel, connection to wearable device 108 that cannot be currently supported by WSG 302, connectivity path selection, or other requests discussed with regards to modules of WSG 302.

Power module 348 may monitor an absolute or relative power level of a battery in WSG 302 providing charge to WSG 302. Power module 348 may periodically or continuously store a current power level to statuses 326 of memory 320. In an embodiment, power module 348 may detect a current power source based on I/O interface 346 and enable the battery to be charged from the current power source.

Resource monitor 349 may monitor and measure one or more hardware or software resource usage of WSG 302. In an embodiment, such resource usage may include one or more of a processor load, a processor speed, a memory load, number of available or configured plug-ins, network bandwidths of one or more possible connectivity paths, signal strengths of one or more cone cavity paths, or other system resource measurements. Depending on rules 324, resource monitor 349 may periodically, continuously, or by request store the one or more measured resource usage as system statuses in statuses 326.

In an embodiment, modules for performing connectivity management 310 may include VPN client 312, plug-in manager 314, user authenticator 316, device detector 318, and connectivity module 319.

VPN client 312 may communicate with a VPN server on agency 102A to establish and maintain a VPN tunnel within IP network 118 between WSG 112 and agency 102A. In an embodiment, VPN client 312 may implement one or more end-to-end encryption methods including hardware or software-based encryption algorithms, such as AES 256, to provide the private and secure communication path between WSG 112A and agency 102A. In an embodiment, all communications between WSG 302 and agency 102A must be transmitted and received through the secure VPN tunnel. In an embodiment, the encryption method may be stored in rules 324 and a current VPN tunnel or encryption method may be stored in statuses 326. In an embodiment, VPN client 312 may be prompted to establish a new VPN tunnel upon request by field personnel 107A or agency 102A or when a connectivity path changes. In an embodiment, VPN client 312 may provide other secure communication means within the selected connectivity path. For example, VPN client 312 may encrypt and decrypt data to and from the VPN server, respectively.

Plug-in manager 314 may manage the number and specific plug-ins 322 or drivers that have been configured in memory 320 to support communication interfaces of corresponding wearable devices 108. One or more configured plug-in 322 may be configured based on initiation by agency 102A, by request of field personnel 107A, or by detecting an unsupported wearable device 108.

In an embodiment, memory 320 may include a configured plug-in 322 for each corresponding wearable device 108 coupled to PAN 110 provided by WSG 302, such as WSG 112A. The number and types of plug-ins may be based on available memory within memory 320, network interfaces 344 supported, or parameters and rule stored in rules 324. In an embodiment, a least recently used plug-in, such as plug-in 322B, may be overwritten or installed with a requested plug-in to support emerging or new wearable devices 108.

In an embodiment, plug-in manager 314 may communicate with application server 106 of agency 102A in order to enable WSG 302 to provide gateway functions supporting wearable devices 108 using different communication interfaces and protocols. For example, a fire department may wish to deploy a new kind of smoke detector, such as wearable device 108A, using a USB interface and running vendor-specific software. In an embodiment, agency 102A may electronically transmit a plug-in configuration or driver for supporting communications with the smoke detector. Plug-in manager 314 may receive the plug-in configuration from agency 102A through a VPN tunnel or secure communication means maintained by VPN client 312. Then, depending on authentication, memory load, and rules 324, plug-in manager 314 may install the received plug-in configuration as, for example, plug-in 322A. In an embodiment, upon detection of the smoke detector, plug-in 322A enables WSG 302 to establish the USB connection and vendor-specific interface needed to communicate with the smoke detector.

Using plug-in manager 314 enables WSG 302 to implement a flexible architecture for extending connectivity to a variety of wearable devices 108, which may include legacy devices using outdated communication protocols or interfaces. Moreover, whereas in conventional systems field personnel 107 may need to upload data gathered by wearable devices 108 to a workstation hours after the data was gathered, configured plug-ins 322 enables WSG 302 to telemeter to agency 102A data gathered by wearable devices 108 in real-time. In an embodiment, this flexible architecture also enables different plug-in 322 to be configured and easily scaled across multiple WSGs 112 such that each field personnel 107 may operate wearable devices 108 specific to field personnel 107.

User authenticator 316 may authenticate whether a person using WSG 302, such as WSG 112A, is field personnel 107A and has permission to use WSG 112A. In an embodiment, user authenticator 316 may authenticate the user as field personnel 107A based on data gathered by wearable devices 108 coupled to PAN 110 and stored in statuses 326. For example, statuses 326 may include one or more of vitals statuses, such as a heart rate or fingerprint identification information gathered by WSG 302 itself or received from one or more devices associated with field personnel 107A, such as mobile device 114. One or more of the vital statuses may be used to confirm an identify and authenticate field personnel 107A. In an embodiment, user authenticator 316 may authenticate field personnel 107A based on a received user identifier and password or key corresponding to personnel 107A from a device, such as mobile device 114, supported by plug-in 322.

In an embodiment, user authenticator 316 may authenticate one or more wearable device 108 based on matching device identification such as MAC addresses or IP addresses, user identification, passwords, or keys received from wearable device 108 against authorized IDs, passwords, and keys stored in rules 324.

Device detector 318 may determine whether one or more wearable device 108, such as devices described with respect to FIG. 2, are within a communication range or within a proximity threshold of WSG 302 based on, for example, a detected signal strength. In an embodiment, the types of detectable devices and whether such devices are in range or within a proximity threshold may be received from agency 102A and configured within rules 324. In an embodiment, device detector 318 may determine whether detected wearable devices 108 use communication interfaces supported by corresponding plug-in 322 installed in memory 320.

In an embodiment, device detector 318 may determine proximity of WSG 302 to devices having access to a WAN such as IP network 118 and further determine an optimal connectivity path for accessing IP network 118. Possible connectivity paths may include connection to a network enabled mobile device 114, router 116, or other WSG 112. As described above, an optimal connectivity path be determined based on various internal and external statuses stored within statuses 326 such as network bandwidths, proximity of devices providing path to WSG 112, or quality of service measured by bit error rate, or parameters or settings within WSG 112 from agency 102A.

Though WSG 302 may have capabilities to form a local ad hoc mesh network 122 and share WAN capabilities of other proximate WSG 112, in an embodiment, WSG 302 may prioritize setting and establishing its own connection to IP network 118 unless a quality of service or other statuses in statuses 326 fall below an acceptable level as defined in rules 324.

Connectivity module 319 may establish communication links or channels within PAN 110 for wearable devices 108 detected by device detector 318 according to configurations within plug-in 322 installed by plug-in manager 314 to support a communication interface and protocol of corresponding wearable devices 108. In an embodiment, field personnel 107 or wearable device 108 may need to be authenticated by user authenticator 316 before connectivity module 319 establishes a communication link with wearable device 108. In an embodiment, connectivity module 319 may receive data and statuses gathered or monitored by wearable device 108 and forward to modules of data processing management 330.

In an embodiment, connectivity module 319 may perform interoperability gateway functions to communicate data or status monitored by wearable device 108 within PAN 110 to agency 102A. As described, such communications may be transmitted and received to and from agency 102A through a wide are data network, such as IP network 118, using the VPN tunnel established by VPN client 312.

In an embodiment, modules for performing data processing management 330 may include data processing module 332, monitoring module 334, and user-alerting module 336.

Data processing module 332 may include functions for processing or interpreting data or statuses received from wearable device 108. Data processing may include data conversion including converting units of received data, such as from beats/second to beats/minute, or converting format of received data for storing and further analysis. Received data and/or processed data may be stored as statuses 326 or as data files, such as video or image files, within memory 320. In an embodiment, data processing module 332 may receive video frames or files from, for example, body-worn camera 212 of FIG. 2, and perform image recognition to detect faces or license plates.

In an embodiment, data processing module 332 may receive from agency 102A a processing measure or percentage, which may be stored in rules 324. The processing measure or percentage enables WSG 302 and agency 102 to distribute processing or interpretation of data monitored by wearable devices 108. Therefore, WSG 302 may take advantage of processing capabilities on-site to provide immediate results and easily scalable processing capabilities of agency 102A, which may be implanted by one or more servers in the cloud. In an embodiment, data processing module 332 may distribute processing between WSG 302 and agency 102A differently between configured plug-in 322 based on stored parameters in rules 324.

Monitoring module 334 may infer field personnel 107's distress as well as a stressful situation, a performance level, a health risk, or a risk of harm from various biometric signals detected, measured, and output by one or more wearable devices 108, such as body-worn biosensors 210 of FIG. 2, detected by device detector 318 and coupled to PAN 110 by connectivity module 319. In an embodiment, monitoring module 334 may be a thin client software application operating within WSG 302 that is coupled to a remote server, such as application server 106 of agency 102A, which hosts a monitoring application software such as administrative module 416 of FIG. 4.

In an embodiment, monitoring module 334 may interpret data from one or more sensors either singularly or in combination using factors including stored rules 324, such as biosensor threshold values that indicate or infer a condition such as physical or psychological distress, a medical emergency, or a presence of a hazard.

In an embodiment, monitoring module 334 compares a biometric signal with a trigger threshold rule within rules 324 and comprising at least one of: a criteria, a parameter, a static rule, or a dynamic rule to detect when the trigger threshold rule is exceeded. The trigger threshold rule may include but is not limited to at least one of: a change in a value over time, a rate of change of values over time, correlations with data from a different biosensor sensor, correlations with data from an environmental sensor, correlations with data from a GPS system, a health or a fitness condition of the user, a condition of other personnel being monitored in proximity to the user, a material rating, a system rating, or a system limit.

Monitoring module 334 may also interpret output from environmental sensors 211 communicatively coupled to WSG 302 by connectivity module 319. Examples of environmental signals include but are not limited to a chemical level, a radiation level, a biological agent, a sound, an ambient temperature, a pressure, a wind chill, a dew point, a humidity level, a precipitation level, an air pollutant level, a lightning strike, a terrain, an altitude, a location, an air quality level, or a change in any of the above (e.g., a change in a chemical level, a dew point, a precipitation level, or a number of lightning strikes).

When one or more conditions are satisfied or a trigger threshold rule is exceeded, monitoring module 334 may detect an event and electronically transmit an activation message via PAN 110 to body-worn camera 212 and/or other cameras having communication interfaces supported by plug-in 322 to initiate audio and/or visual recording and to transmit the recordings to connectivity module 319 with interoperability gateway functions to send the data to agency 102A.

In an embodiment involving non-wearable beacons, such as beacons 216A-B from FIG. 2, monitoring module 334 may trigger other wearable device 108 based on whether beacon 216A or beacon 216B are in close proximity and other attributes of field personnel operating WSG 302. For example, as shown in FIG. 2, beacon 216B is not within proximity 217 of field personnel 207 and beacon 216A is within proximity 217. In an embodiment, when field personnel wearing WSG 302 leaves a range of beacon 216A statically stationed within a police department, beacon 216A may no longer be in proximity 217 and monitoring module 334 of WSG 302 may trigger body-worn camera 212 to start. In an embodiment, a trigger may include one or more commands for controlling wearable device 108 depending on the specific configurations for beacon 216A and wearable device 108 worn or carried by field personnel 207. Example commands may include turning on device, starting operation such as recording, or sounding an alarm.

In addition, monitoring module 334 may electronically request connectivity module 319 to transmit an event alert message substantially at the same time to agency 102A via a currently selected optimal connectivity path. The event alert message may include information including but not limited to the identity of the biosensor wearing personnel, the biosensor identification, the biosensor data received and processed by monitoring module 334, transformed data derived or based on the biosensor data received (e.g., output from body-worn biosensor 210) depending on processing limitations specified by data processing module 332, the location of the subject wearing the body-worn biosensor, and other environmental or context information.

For example, an accelerometer may be body-worn biosensor 210 that records and electronically transmits information regarding an unusual acceleration of the personnel wearing the biosensor (field personnel 207) indicating a chase, or a deceleration indicating a sudden impact. When the body-worn accelerometer electronically transmits information indicating a sudden deceleration coupled within an increase in the heart rate of field personnel 207 exceeding a normal level as specified in rules 324, monitoring module 334 may use algorithms in rules 324 to infer that an accident has occurred, or a sudden vehicle stop occurred followed by a foot chase or other strenuous physical activity, especially when coupled with location information such as a body-worn GPS unit. With location information over time, monitoring module 334 may use algorithms to infer whether field personnel 207 may be incapacitated by a lack of movement, or that a foot chase is occurring based on changing location information over time that shows movement at an extrapolated rate within a human running pace rate. Further, if biometric signals from the body-worn accelerometer shows further accelerating and decelerating movements, the monitoring module 334 may infer that a possible physical struggle or altercation is occurring.

Sample Rule. Below is an example of a trigger threshold rule.

IF filed personnel 207's accelerometer exceeds −3.0 g at time t
AND IF field personnel 207's heart rate monitor values exceeds the value 120 bpm within 3 seconds prior or 60 seconds after time t, THEN send Event Alert message to agency 102A
WHERE the Event Alert message shall contain Wearer ID, Event ID Code and Latitude and Longitude.

The Event Alert message is electronically transmitted to the associated or designated agency 102A by monitoring module 334 via a routing interoperability gateway functions provided by connectivity module 319. The Event Alert message may also be electronically transmitted via a communications network (e.g., PAN 110) to one or more other computing clients such as smartphones (e.g., mobile device 114 with broadband data) where the Event Alert message may be displayed through the computing client application GUI.

In an embodiment, monitoring module 334 may include rules and parameters or be coupled to an automated messaging module (not shown) which contains rules and parameters that electronically transmit advisory messages to the field personnel being monitored. An advisory message may be an audio and/or visual message that includes information such as warnings or status updates regarding body-worn biosensor 210 signals, other biosensor signals, and/or environmental sensor signals, including changes in sensor signals. Advisory messages may be based on the same parameters and rules as Event Alerts or use different threshold values. Advisory messages may be advisory and/or include a user action prompt. For example, an advisory message may indicate that an event alert condition is detected and an emergency incident will be reported unless field personnel 207 declines within a specified time frame, field personnel 207 may select to electronically transmit an event alert message. Field users may interact with monitoring module 334 via I/O interface 346 of WSG 302 including, for example, a GUI display, buttons, a voice interaction interface, or a gesture recognition interface.

In an embodiment, upon fulfilling one or more chained rules, the advisory message or notice may be generated by monitoring module 334 and sent to other WSG 112 via connectivity module 319. For example, upon WSG 302, such as WSG 112C, detecting a radioactivity exceeding thresholds of rules 324, other WSG 112, such as WSG 112D, may receive the advisory message via local ad hoc mesh network 122.

User-alerting module 336 may activate one or more output transducers managed by I/O interface 346 based on request or input from monitoring module to notify field personnel 107 of the advisory message or condition detected by monitoring module 334. For example, upon receiving a warning message from monitoring module 334 indicating that a heart rate of field personnel 107 has exceeded a bpm threshold, user-alerting module 336 may activate a speaker to beep, a light to flash, or a motor to vibrate to warn field personnel 107 of exceeding a pre-determined threshold. The threshold, in this case for heart rate, may be specific to field personnel 107 and pre-determined and stored in rules 324 or may be dynamically determined based on detected statuses of field personnel 107 and environmental conditions.

Figure 4:
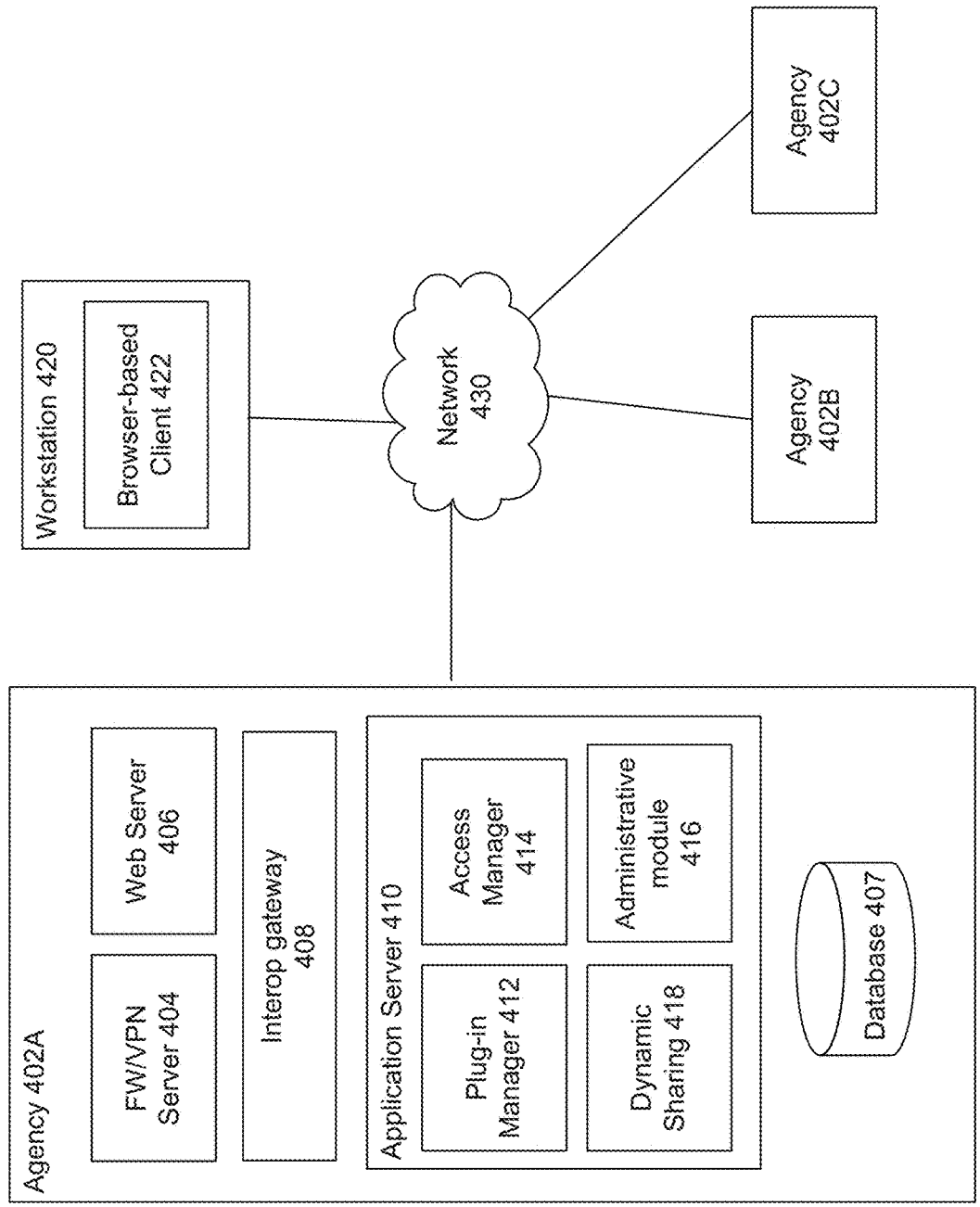
FIG. 4 is a block diagram of a system of agencies coupled to a network, according to an embodiment.

FIG. 4 is a block diagram of a system 400 illustrating agencies 402 coupled via network 430, according to an example embodiment. Agency 402 may each be implemented on one or more servers and represent a security domain specific to a public safety agency. In an embodiment, agency 402, such as agency 402A, may be an exemplary implementation of agency 102A of system 100 from FIG. 1. Therefore, FW/VPN server 404, interop gateway 408, and application server 410 may be exemplary implementations of FW/VPN server 104, interop gateway 105, and application server 106, respectively. For ease of understanding, descriptions of the components of FIG. 4 may refer to FIGS. 1-3.

FW/VPN server 404 may include one or more processors for establishing virtual private network (VPN) tunnels between WSGs 112 managed by agency 402A, such as field personnel 107 managed by agency 102A and further described in FIG. 1. In an embodiment, FW/VPN server 404 may include any of hardware FPG-based or software-based encryption algorithms, such as AES256, that is loaded within VPN client 312 of respective WSG 302 operated by field personnel 107. In an embodiment, FW/VPN server 404 may further provide firewalling functions to monitor and control incoming and outgoing network traffic to and from agency 102A.

Interop gateway 408 operates similarly to interop gateway 105 of FIG. 1 and implements operability gateway functions to enable data monitored by wearable devices 108 of field personnel 107 associated with agency 102A, e.g., agency 402A, to be communicated to and with other agencies 402B-C through network 416. In an embodiment, network 430 may be similar to network 120 of FIG. 1 and implemented as an IP network or as a private, public safety network, such as FirstNet.

Web server 406 may enable a WSG application hosted or implemented by application server 410 to be accessed through browser-based client 422 of workstation 420 operated by an administrator or operator. Workstation 420 may be a desktop, laptop, mobile device, or other computing devices capable of accessing network 430 such as Google glass or a smart watch. In an embodiment, web server 406 or application server 410 may enable access to the WSG application through one or more WSG application instances (not shown) installed on workstation 420.

Database 407 may be any type of structured data store, including a relational database that stores information associated with agency 402A or WSGs of each field personnel 107. For example, database 407 may store rules 324 of WSG 302, number and types of plug-in 322 configured on WSG 302, and current or historical statuses and data telemetered to agency 402A via WSG 302.

Application server 410 may manage WSGs, such as WSG 302 of FIG. 3 or WSG 112 of FIG. 1, operated by field personnel 107 associated with agency 402A. In an embodiment, application server 410 may also provide or host the WSG application implementing a GUI that helps an administrator or operator of workstation 420 monitor statuses or data of field personnel 107 captured by wearable devices 108. In an embodiment, application server 410 may include the following modules: plug-in manager 412, access manager 414, administrative module 416, and dynamic sharing 418. A module (or component) of application server 410 may include a selection of stored operations that when executing in the one or more processors of application server 410 causes the one or more processors to perform the operations of the module.

Plug-in manager 412 may manage and configure the number or types of drivers or plug-ins supported by WSG 302 operated by a corresponding field personnel 107. In an embodiment, an operator of workstation 420 may load a specific plug-in configuration for supporting, for example, wearable device 108A. Plug-in manger 412 may electronically transmit, via VPN tunnels established by FW/VPN server 404, a request to, for example, WSG 302 to install and configure the loaded plug-in configuration to memory 320. In an embodiment, plug-in manager 314 may store in database 407 the loaded plug-in configuration in association with WSGs instructed to install the plug-in configuration. Depending on various attributes stored in database and including one or more of field personnel 107 attributes, wearable devices 108 operated by field personnel 107, or system statuses of WSGs of field personnel 107, plug-in manger 412 may transmit the loaded plug-in configuration to only a subset of field personnel 107.

In an embodiment, plug-in manger 412 may receive a request from a WSG, such as WSG 302, to support a specific wearable device. Depending on an authorization determination by access manager 414, plug-in manager 412 may then load the requested plug-in configuration to support the specific wearable device and transmit the loaded plug-in configuration to WSG 302.

In an embodiment, plug-in manager 412 may store in database 407 WSGs 112 that were not able to successfully download and install the plug-in configuration loaded on application server 410. For example, one or more WSGs 112 may be offline and not connected to IP network 118 of FIG. 1. In an embodiment, plug-in manager 412 may periodically transmit the failed plug-in configuration download attempts or receive an update request from WSGs 112 upon first connection to IP network 118.

Access manager 414 may assign attributes to users, such as field personnel 107 and operators of workstation 420. An assigned attribute of a user may include any of the following: an identity, a key or password, a job title, one or more task, one or more wearable devices associated with the user, one or more agency or group affiliations, one or more access privilege status, or one or more priority settings. The assignments may be received from, for example, an administrator, a human resources manager, or the user's supervisor. In an embodiment, access manager 414 may store the attributes of the user and permission settings associated with each attribute in database 407.

In an embodiment, access manager 414 may determine whether to authorize an administrator or operator using workstation 420 to access the WSG application hosted by application server 410. Access manager 414 may compare one or more user attributes such as a user identification and password or key received from browser-based client 422 with IDs and passwords or keys stored in database 407. In an embodiment, the number of WSGs 112 and specific WSGs 112 along with types of data telemetered by WSGs 112 that are observable and managed by the operator within a GUI provided to browser-based client 422 may depend on attributes and permissions assigned to the requesting administrator or operator.

Therefore, a supervising administrator of workstation 420 may see statuses telemetered from WSG 112 of field personnel 107 under the supervising administrator's command.

In an embodiment, some statuses such as a location status of field personnel 107 may be available to any authorized administrator.

Dynamic sharing 418 may work with interop gateway 408 to facilitate dynamic media sharing of data or statuses gathered by field personnel 107 with other agencies 402B-C via network 430. Such methods are discussed in prior filed U.S. Patent Publication 2013/0198517 discussed above. In an embodiment, data and statuses may be shared via browser-based client 422 or third party platforms managed by operators of other agencies 402B-C.

Administrative module 416 may include a software application running on application server 410 and providing a GUI view of the WSG application hosted or implemented by application server 410. In an embodiment, administrative module 416 may be coupled to an application database, such as database 407, or an external database resource such as a directory. Administrative module 416 enables an operator or administrator to manage WSG 112 aggregating, filtering, and processing statuses and data monitored by coupled wearable devices 108, such as body-worn biosensor 210 and/or environmental sensors 211 of FIG. 2, as well as to establish trigger threshold rules stored in rules 324 of WSG 302 and include but are not limited to an established criteria, a parameter, a static rule, or a dynamic rule. The sensors are registered with administrative module 416 and may be assigned a unique identification which may be based on but not limited to at least one unique identifier such as: a sensor machine address, a serial number, an encryption key, an electronic serial number, a telephone number, or an IP address. The sensor ID may be further associated with a unique identification of an individual, field personnel 107, wearing the wearable device 108, such as body-worn camera 212 of FIG. 2, or an individual in proximity to the wearable device 108, where the individual's unique identifier may include but is not limited to at least one of: a name, an agency name, a department ID, an employee ID number, an operator number, a team ID, a badge number, or a social security number.

In an embodiment, administrative module 222 rules or parameters may be unique for each field personnel 107 or each wearable device 108 associated with each field personnel 107, or may be the same for all field personnel 107 or subset of field personnel 107 wearing the same functional type of wearable device 108. For example, field personnel 107A may be assigned a threshold parameter of 120 beats per minute for a heart rate monitor and field personnel 107B may be assigned a threshold parameter of 140 beats per minute for a heart rate monitor.

Administrative module 416 may be centrally provisioned at application server 410 and then trigger threshold rules associated with field personnel 107 are electronically transmitted to and stored by monitoring module 334 of WSG 302 operated by a field personnel. Alternatively, trigger threshold rules may be provisioned by a field personnel associated with or wearing the wearable device. For example, field personnel 107A may set trigger threshold rules through a GUI of WSG 112A. In an embodiment, trigger threshold rules include a combination of rules provisioned centrally by administrative module 416 and rules provisioned by field personnel 107 associated with one or more wearable devices 108 coupled to WSG 112.

Administrative module 416 may be coupled with one or more directories and databases of other systems and software applications (not shown) which contain, maintain, and update user identification, communications and media asset identification, routing, addressing and other information.

Administrative module 416 may utilize data in the one or more directories singly or in combination, and may transform and store data in an administrative module directory or database, such as database 407.

Figure 5:
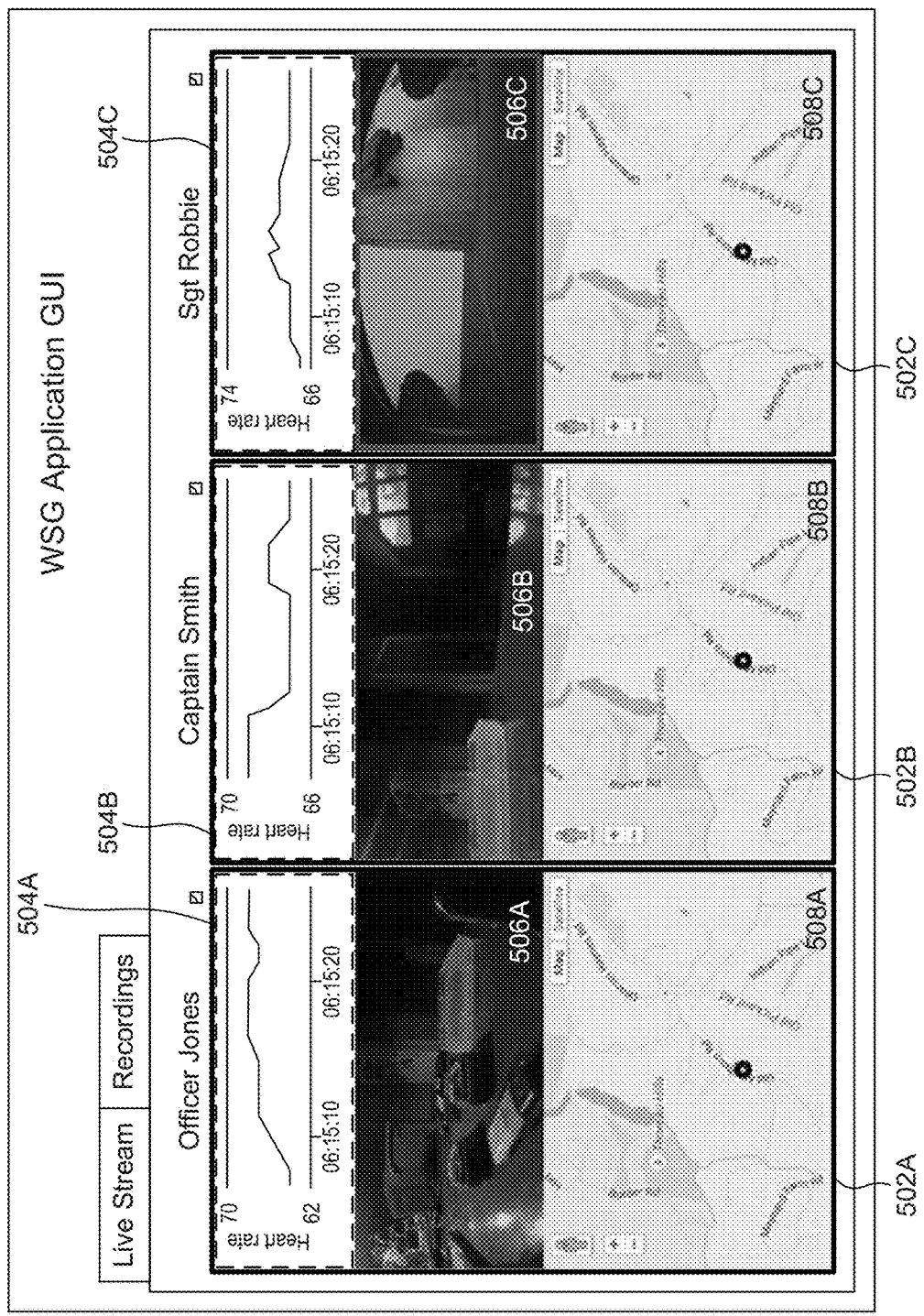
FIG. 5 is a diagram of an example GUI view of a WSG application, according to an example embodiment.

FIG. 5 is an example GUI view 500 of the WSG application implemented or hosted by an agency, such as application server 410 of agency 402A from FIG. 4. For ease of understanding, reference may be made to FIG. 2-4.

In an embodiment, GUI view 500 depicts WSG panes 502 corresponding to field personnel, such as field personnel 107, operating respective WSGs, such as WSG 202 or WSG 302. Each WSG pane 502 may depict statuses or data monitored by wearable devices 108 coupled to WSG 202 and received by administrative module 416 from WSG 112. For example, WSG pane 502 may include a historical heart rate status 504 provided by body-worn biosensor 210, live video feed view 506 provided by body-worn camera 212, and real-time location 508. Real-time location 508 may be received from WSG 302 and determined by GPS module 342 within WSG 302, an example embodiment of WSG 202, or determined by another wearable device coupled to WSG 302.

In an embodiment, the administrator may be the police chief of agency 402A and access manager 414 may, therefore, enable the administrator to view and access information and statuses of all three field personnel including "Officer Jones," "Captain Smith," and "Sgt Robbie" from the police department agency. For example, the number and specific field personnel views available to the administrator may be based on attributes of the police chief including, for example, a permission, a rank, a task, a user identity, or a group identification.

In an embodiment, an alert message may be triggered on Sgt Robbie's WSG, such as by monitoring module 334 on WSG 302. Upon receiving the alert message, administrative module 416 of application server 410 providing the WSG application may indicate the alert message within WSG pane 502C corresponding to Sgt Robbie. As shown, live video feed view 506C may be, for example, bolded with a red frame.

Whereas conventional body-worn cameras 212 are stand-alone systems and are not connected to, or integrated with communications devices typically used in responding situations, a WSG such as WSG 202 enables a live video feed of body-worn cameras to be streamed directly to video feed view 506 within the WSG application GUI of FIG. 5.

Figure 6:
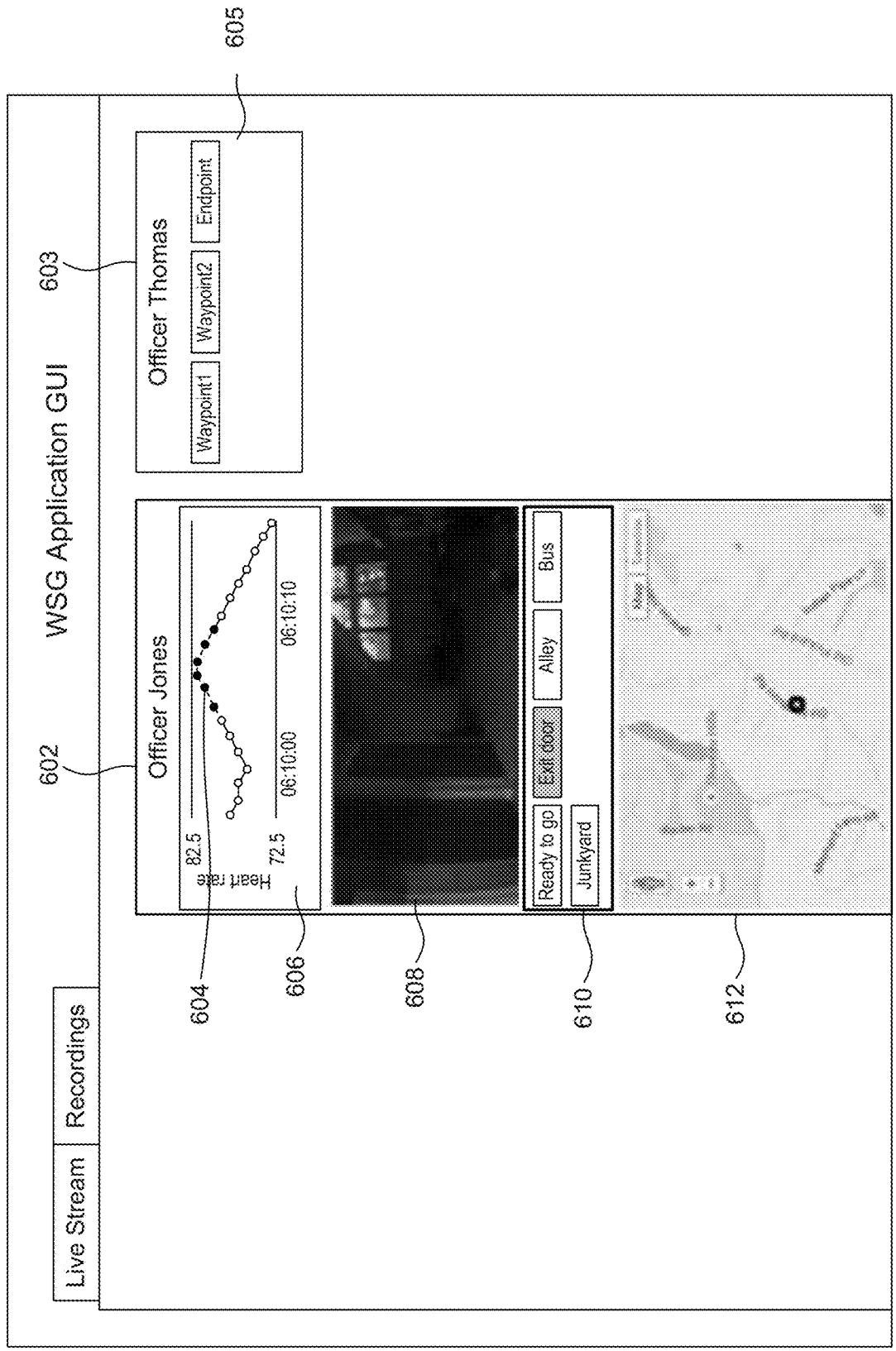
FIG. 6 is a diagram of an example GUI view of a WSG application, according to an example embodiment.

FIG. 6 is an example GUI view 600 of the WSG application implemented or hosted by an agency, such as application server 410 of agency 402A from FIG. 4. For ease of understanding, reference may be made to FIG. 2-4.

Similar to FIG. 5, the example GUI view 600 depicts WSG panes 602 and 603 corresponding to field personnel, such as field personnel 107, operating respective WSGs, such as WSG 202 or WSG 302. Each WSG panes 602 may depict statuses or data monitored by wearable devices 108 coupled to WSG 112, such as WSG 302, and received by administrative module 416 from WSG 112. For example, WSG pane 602 may include a historical heart rate status 606 provided by body-worn biosensor 210, live video feed view 608 provided by body-worn camera 212, beacon indications 610 determined based on signals from beacon 216, and real-time location 612. Real-time location 612 may be received from WSG 302 and determined by GPS module 342 within WSG 302, an example embodiment of WSG 202, or determined by another wearable device coupled to WSG 302.

Whereas in FIG. 5, an alert message received by application server 410 may be related to a video feed and indicated as a bolded red box around live video feed 506C of Sgt Robbie, an alert message indicating a heart rate exceeding, for example, 80 bpm may be bolded 604 within historical heart rate status 606. Therefore, an alert message related to a monitored status may be indicated in association with the monitored status within GUI view 600.

Additionally, an administrator accessing workstation 420 may be determined by access manager 414 to not have permission to access information and statuses telemetered by a WSG operated by "Officer Thomas." Therefore, WSG pane 603 corresponding to "Officer Thomas" may display limited statuses, such as beacon indications 605.

In an embodiment, wearable devices coupled to WSGs may include beacons depicted as beacon indications 610. Based on beacon signals received from a WSG, Administrative module 416 may indicate a field personnel is within proximity to that beacon. For example, beacon "Exit Door" may be shaded to indicate that "Officer Jones" is within proximity of that beacon. Therefore, beacons enable an administrator to obtain more fine-grained data related to field personnel locations, such as within a building where GPS data may be too coarse grained to provide useful indoor location data. In an embodiment, a WSG may further detect when a specific beacon, such as "Exit Door," is no longer within proximity of the WSG. Upon this detection, administrative module 416 may indicate this result by, for example, de-shading the "Exit Door" beacon from beacon indications 610.

Method

Figure 7:
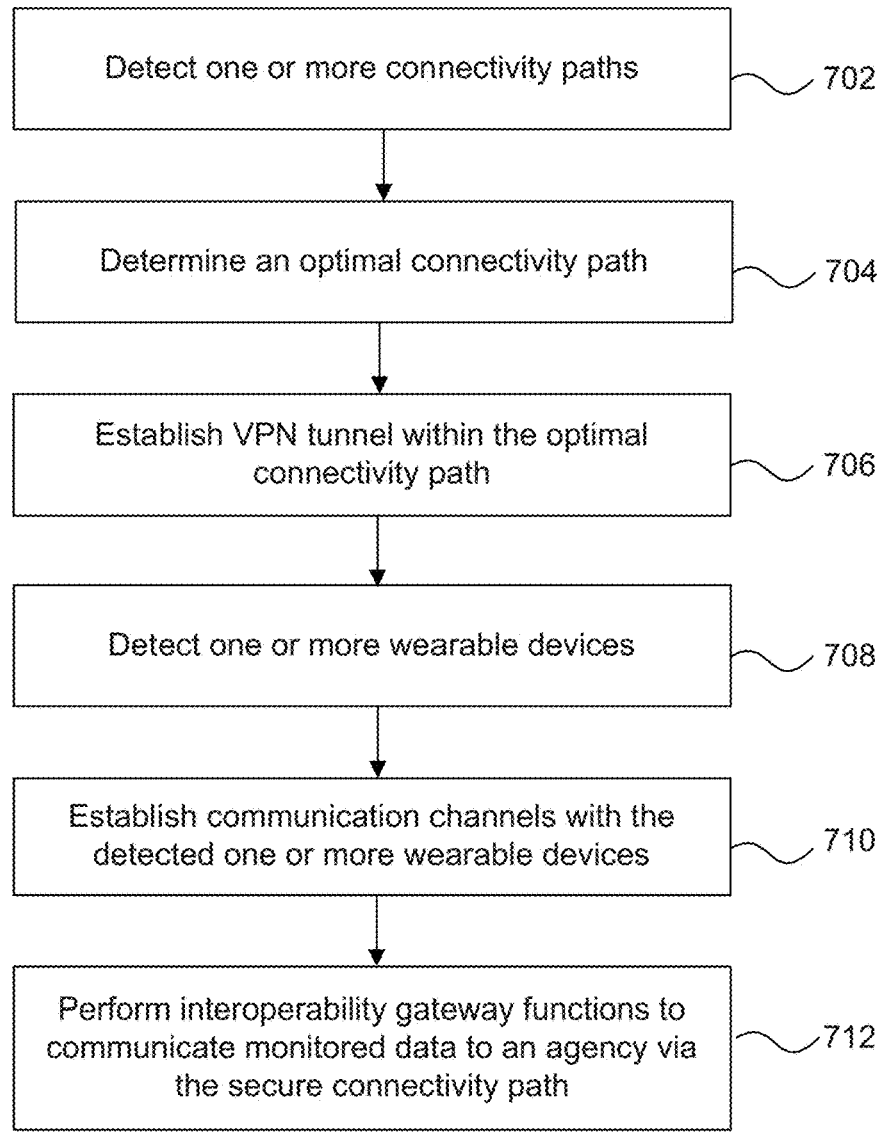
FIG. 7 is a flow chart of a method for enabling a WSG to telemeter data to an agency, according to an example embodiment.

FIG. 7 is a flow chart of a method 700 for enabling a wearable smart gateway (WSG) to telemeter data from detected wearable devices to an agency, according to an example embodiment. Method 700 can be performed by processing logic that may comprise hardware (e.g., circuitry, dedicated logic, programmable logic, microcode, etc.), software (e.g., instructions running on a processing device), or a combination thereof. In an embodiment, not all the steps may need to be performed in the order specified. For example, steps 702-706 may be performed concurrently with or after any of steps 708-710.

In step 702, a device detector on the WSG, such as device detector 318 of WSG 302 of FIG. 3, detects one or more connectivity paths provided by corresponding detected devices where each connectivity path accesses a wide area data network, such as IP network 118 of FIG. 1, coupled to an agency, such as agency 102A, associated with a field personnel operating the WSG. In an embodiment, the detected device may be WSG itself, a mobile device, a router, or another WSG that is capable of forming a local ad hoc mesh network.

In step 704, the device detector may determine an optimal connectivity path and corresponding path-providing device based on one or more attributes measured by the WSG, such as statuses stored in statuses 326, that are within thresholds and parameters set within, for example, rules 324 of memory 320. In an embodiment, the WSG may be configured to access the WAN through one or more of the following paths: directly to the WAN, through a mobile device, through another WSG, or through a router.

In an embodiment, the optimal connectivity path may be dynamically determined based on the types of available connectivity paths, available bandwidth throughput of the connectivity paths, signal strength, processor speed, proximity to devices providing connectivity path, quality of service measured by bit error rate, a relative number of transmission links, user preferences, agency settings, or battery life of the WSG. For example, if the WSG only has connectivity to the router, then the WSG communicates with the agency via the router.

In an embodiment, WSG may have functionality to communicate with other WSGs forming a WSG mesh network, such as local ad hoc mesh network 122, of WSGs. In such a case, the WSG may further consider whether to communicate information from the detected device to another WSG that may further relay the communicated information to other WSGs. Information may be chain relayed from one WSG to another WSG until the receiving WSG is designated as the relay gateway. Patent application Ser. No. 14/615,070 further describes the process for determining the relay gateway within a mesh network of WSGs.

In an embodiment, an optimal connectivity path may be selected by the field personnel operating the WSG or be limited to certain paths based on network hardware or software available on the WSG.

In step 706, a VPN client, such as VPN client 312, establishes a VPN tunnel within the optimal connectivity path between the WSG and the agency using the determined optimal connectivity path of step 704. Upon establishing the secure VPN tunnel, data communications between the WSG and the agency are communicated privately and securely.

In step 708, the device detector detects one or more wearable devices within a proximity of the WSG. In an embodiment, the device detector may detect only wearable devices operating communication interfaces supported by corresponding plug-ins installed on the WSG, such as plug-in 322 from WSG 302.

In step 710, a connectivity module, such as connectivity module 319 of FIG. 3, establishes communication channels with the detected one or more wearable devices of step 708. In an embodiment, a user authenticator, such as user authenticator 316, may need to determine whether the WSG is authorized to communicate with a detected wearable device and the detected wearable device must have a corresponding plug-in installed on the WSG before the connectivity module may establish the communication channel.

In step 712, the connectivity module performs interoperability gateway functions to communicate to the agency the data monitored by the detected one or more devices and obtained via the established communication channels of step 710. The connectivity module may communicate monitored data from the WSG to the agency through the secure connectivity path established in step 706.

Figure 8:
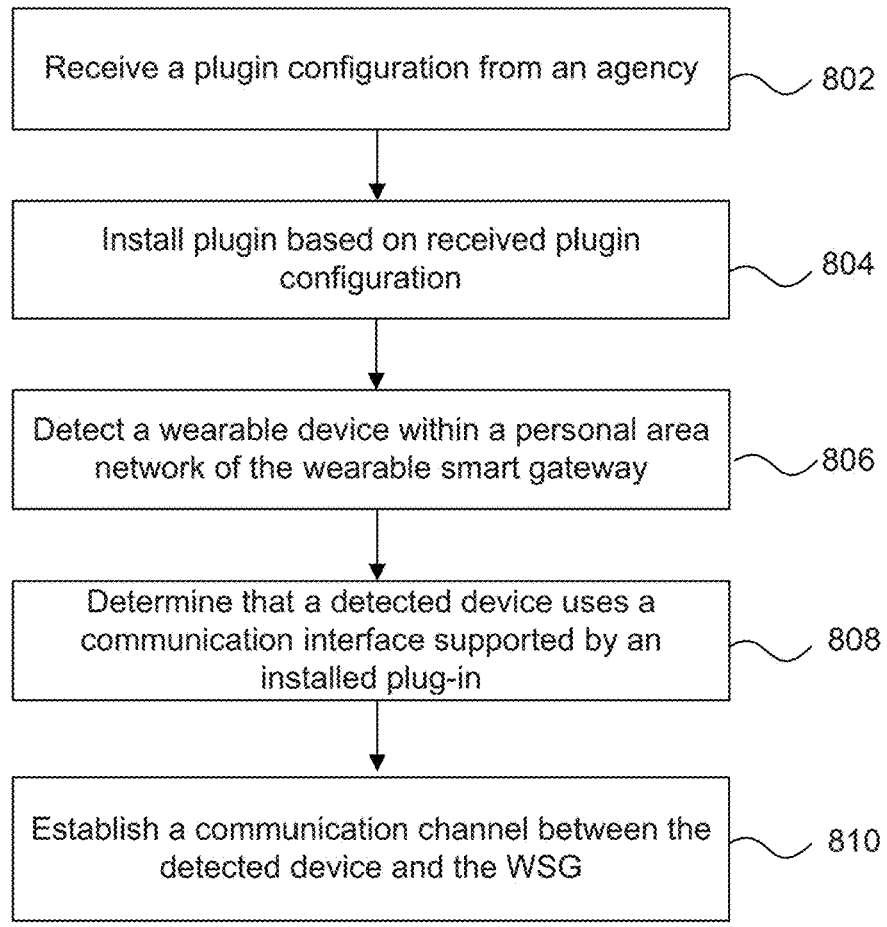
FIG. 8 is a flow chart of a method for enabling a WSG to flexibly interface with different wearable devices, according to an example embodiment.

FIG. 8 is a flow chart of a method 800 for enabling a WSG to flexibly interface with different wearable devices, according to an example embodiment. Method 800 can be performed by processing logic that may comprise hardware (e.g., circuitry, dedicated logic, programmable logic, microcode, etc.), software (e.g., instructions running on a processing device), or a combination thereof. In an embodiment, not all the steps may be performed or in the order specified.

In step 802, a plug-in manager of the WSG, such as plug-in manger 314 of WSG 302 of FIG. 3, receives a plug-in configuration from an agency, such as agency 402A of FIG. 4, through a data network, such as IP network 118 of FIG. 1. In an embodiment, the WSG may have been preconfigured with the one or more plug-in configurations to support communication interfaces operated by specific wearable devices.

In an embodiment, an operator may access a WSG monitoring application provided by application server of the agency, such as application server 410 of agency 402A, to add communication interfaces or protocols that should be installed on the WSG. For example, when a new wearable device enters the market, a plug-in configuration supporting the communication interface of the new wearable device is loaded on the application server and transmitted to be downloaded at the WSG.

In step 804, the plug-in manager downloads and installs the plug-in to memory, such as to plug-in 322A of memory 320, based on the received plug-in configuration of step 802.

In step 806, a device detector, such as device detector 318 of WSG 302, detects a wearable device within a proximity of the WSG or accessing a PAN, such as PAN 110A, of the WSG.

In step 808, the device detector determines that the detected device uses a communication interfaces supported by an installed plug-in, such as the installed plug-in of step 804. In an embodiment, if no installed plug-in supporting the detected device is located, the device detector may send a request to the agency requesting the agency to provide the communication interface to support the detected device. In this embodiment, steps 802 and 804 may be repeated for the requested plug-in configuration.

In step 810, a connectivity module, such as connectivity module 319 of WSG 302, establishes a communication channel between the detected device of step 808 and the WSG. In an embodiment, the communication channel or link may be provided to the detected device of step 808 through a PAN, such as PAN 110 of FIG. 1.

System Implementation

Figure 9:
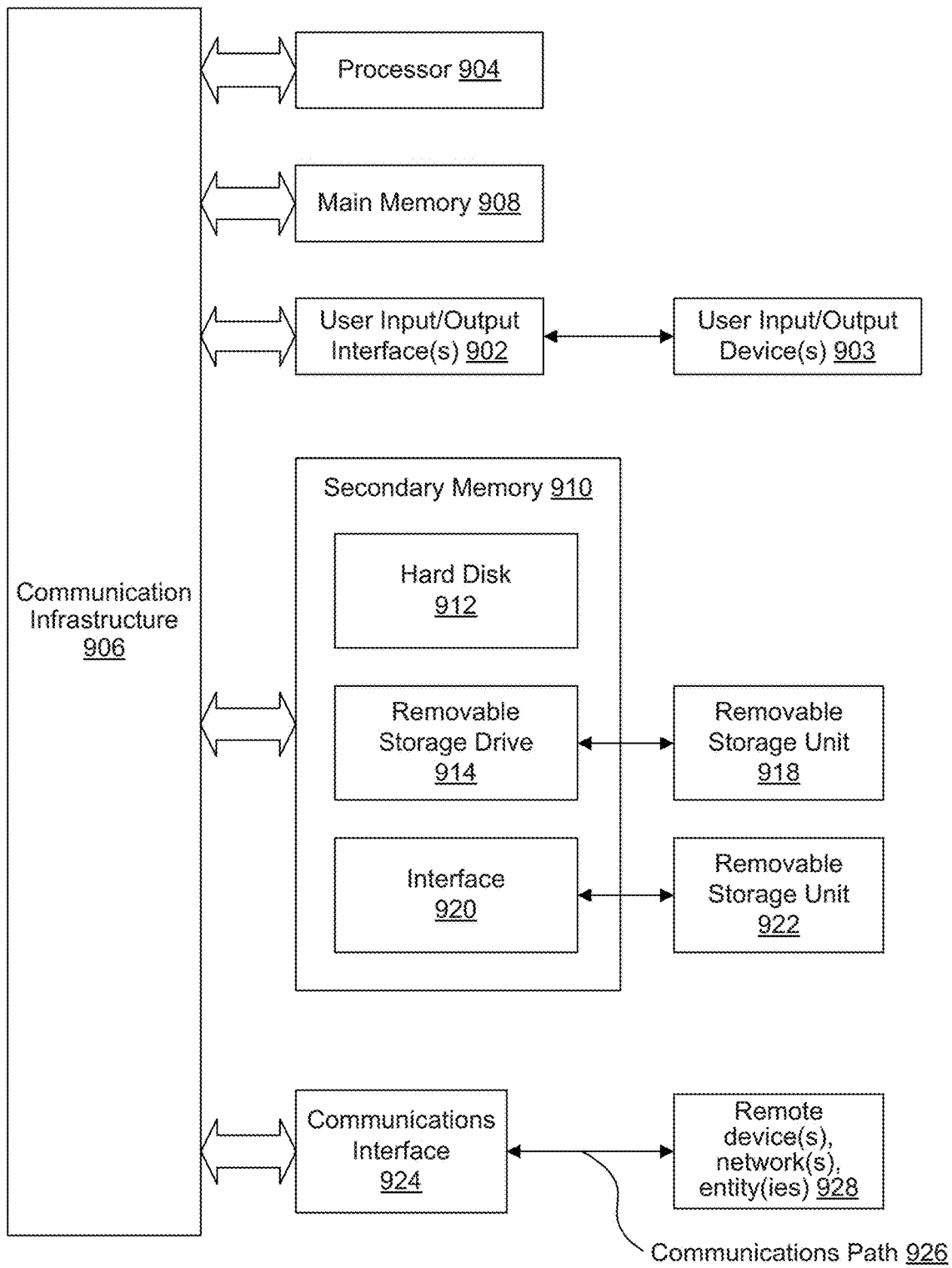
FIG. 9 is a diagram of an example computing system, according to an example embodiment.

Various embodiments can be implemented, by software, firmware, hardware, or a combination thereof. FIG. 9 illustrates and example computer system 900 in which the systems and devices described within various embodiments can be implemented as computer-readable code and/or text-readable code. After reading this description, it will become apparent to a person skilled in the relevant art how to implement the embodiments using other systems and/or processing architectures.

Computer system 900 includes one or more processors (also called central processing units, or CPUs), such as a processor 904. Processor 904 is connected to a communication infrastructure or bus 906.

One or more processors 904 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 909, such as random access memory (RAM). Main memory 909 may include one or more levels of cache. Main memory 909 has stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 818. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to an exemplary embodiment, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

In an embodiment, a tangible apparatus or article of manufacture comprising a tangible computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 7. In particular, embodiments may operate with software, hardware, and/or operating system implementations other than those described herein.

Conclusion

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

The breadth and scope of the invention should not be limited by any of the above-described exemplary embodiments, but should be defined only in accordance with the following claims and their equivalents.

What is claimed is:

1. A wearable smart gateway device, comprising:
   a memory;
   at least one processor coupled to the memory and configured to:
   detect a first device within a proximity threshold of the wearable smart gateway device, wherein the first device operates using a first communication protocol;
   detect a second device within the proximity threshold of the wearable smart gateway device, wherein the second device operates using a second communication protocol that is a different communication protocol than the first communication protocol;
   establish a personal area network with the first device and the second device, the personal area network comprising a first communication link between first device and the wearable smart gateway using the first communication protocol, and a second communication link between the second device and the wearable smart gateway using the second communication protocol;
   receive first data from the first device over the first communication link and second data from the second device over the second communication link; and
   perform interoperability gateway functions to communicate the first data and the second data to an agency via a wide area data network.

2. The wearable smart gateway device of claim 1, wherein the at least one processor is further configured to:
   detect a connectivity path provided by one or more network devices having access to the wide area data network; and
   establish a VPN tunnel within the detected connectivity path, wherein the first and second data are communicated within the VPN tunnel to the agency.

3. The wearable smart gateway device of claim 1, wherein the at least one processor is further configured to:
   detect a connectivity path provided by one or more network devices having access to the wide area data network; and
   encrypt, within the detected connectivity path, the monitored data communicated to the agency.

4. The wearable smart gateway device of claim 1, wherein the at least one processor is further configured to:
   receive, from at least one of the first device or the second device, a vitals status monitored by the at least one of the first device or the second device, wherein the vitals status indicates a current status of a user operating the at least one detected device; and receive, from the agency, a threshold rule for the vitals status.

5. The wearable smart gateway device of claim 4, further comprising an output transducer configured to provide an alert when the vitals status exceeds the threshold rule, wherein the alert comprises at least one of a sound, a light, or a haptic feedback.

6. The wearable smart gateway device of claim 4, wherein the at least one processor is further configured to provide control signals to at least one device within the personal area network when the vitals status exceeds the threshold rule.

7. The wearable smart gateway device of claim 6, wherein the at least one device comprises a body-worn camera, and wherein the control signals are configured to activate operation of the body-worn camera.

8. The wearable smart gateway device of claim 1, wherein the at least one processor is further configured to:
compare an identification associated with a user of the wearable smart gateway device to an identification of the wearable smart gateway device; and
authenticate the user based at least in part on the comparison.

9. The wearable smart gateway device of claim 8, wherein the at least one processor is further configured to:
perform one or more processing operations on at least a portion of the received first data or the received second data, the one or more processing operations yielding processed first data or processed second data;
wherein performing the interoperability gateway functions comprises communicating the processed first data or the processed second data to the agency via the wide area network.

10. The wearable smart gateway device of claim 1, wherein the at least one processor is further configured to:
store at least one of the received first data and the received second data in the memory; and
detect one or more connectivity paths to the wide area network;
wherein performing interoperability gateway functions comprises communicating the stored at least one of the received first data and the received second data to the agency via the wide area network subsequent to the detection of the one or more connectivity paths.

11. A method, comprising:
detecting, by a wearable smart gateway (WSG) implemented on one or more processors, a first device within a proximity threshold of the WSG, wherein the first device operates using a first communication protocol;
detecting, by the WSG, a second device within the proximity threshold of the WSG, wherein the second device operates using a second communication protocol that is a different communication protocol than the first communication protocol;
establishing, by the WSG, a personal area network with the first device and the second device, the personal area network comprising a first communication link between first device and the WSG using the first communication protocol, and a second communication link between the second device and the WSG using the second communication protocol;
receiving, by the WSG, first data from the first device over the first communication link and second data from the second device over the second communication link; and performing, by the WSG, interoperability gateway functions to communicate the first data and the second data to an agency via a wide area data network.

12. The method of claim 11, further comprising:
detecting, by the WSG, a connectivity path provided by one or more network devices having access to the wide area data network; and
establishing, by the WSG, a VPN tunnel within the detected connectivity path, wherein the first and second data are communicated within the VPN tunnel to the agency.

13. The method of claim 11, further comprising:
receiving, by the WSG, from at least one of the first device or the second device, a vitals status monitored by the at least one of the first device or the second device, wherein the vitals status indicates a current status of a user operating the at least one detected device;
receiving, by the WSG, from the agency, a threshold rule for the vitals status; and
providing, by an output transducer of the WSG, an alert when the vitals status exceeds the threshold rule, wherein the alert comprises at least one of a sound, a light, or a haptic feedback.

14. The method of claim 11, further comprising:
comparing, by the WSG, an identification associated with a user of the WSG to an identification of the WSG; and
authenticating, by the WSG, the user based at least in part on the comparison.

15. The method of claim 11, further comprising:
performing, by the WSG, one or more processing operations on at least a portion of the received first data or the received second data, the one or more processing operations yielding processed first data or processed second data;
wherein performing the interoperability gateway functions comprises communicating the processed first data or the processed second data to the agency via the wide area network.

16. The method of claim 11, further comprising:
storing, by the WSG, at least one of the received first data and the received second data in a memory of the WSG; and
detecting, by the WSG, one or more connectivity paths to the wide area network;
wherein performing the interoperability gateway functions comprises communicating the stored at least one of the received first data and the received second data to the agency via the wide area network subsequent to the detection of the one or more connectivity paths.

17. A portable system, comprising:
a memory;
at least one networking chip;
at least one processor coupled to the memory and the at least one networking chip;
a connectivity management module that when executing in the at least one processor:
detects a first device within a proximity threshold of a wearable smart gateway device, wherein the first device operates using a first communication protocol;
detects a second device within the proximity threshold of the wearable smart gateway device, wherein the second device operates using a second communication protocol that is a different communication protocol than the first communication protocol;
establishes a personal area network with the first device and the second device, the personal area network comprising a first communication link between first device and the wearable smart gateway using the first communication protocol, and a second communication link between the second device and the wearable smart gateway using the second communication protocol;

receives first data from the first device over the first communication link and second data from the second device over the second communication link; and performs interoperability gateway functions to communicate the first data and the second data to an agency via a wide area data network.

18. The portable system of claim 17, further comprising:
a data processing management module that when executing in the at least one processor:
receives, from at least one of the first device or the second device, a vitals status monitored by the at least one of the first device or the second device, wherein the vitals status indicates a current status of a user operating the at least one detected device; and receives, from the agency, a threshold rule for the vitals status.

19. The portable system of claim 18, further comprising an output transducer configured to provide an alert when the vitals status exceeds the threshold rule, wherein the alert comprises at least one of a sound, a light, or a haptic feedback.

20. The portable system of claim 17, wherein the connectivity management module, when executing in the at least one processor:
compares an identification associated with a user of the wearable smart gateway device to an identification of the wearable smart gateway device; and authenticates the user based at least in part on the comparison.

* * * * *